July 27, 1948.  A. P. ADAMSON  2,445,986
STATOR WINDING METHOD AND APPARATUS THEREFOR
Filed Aug. 8, 1946
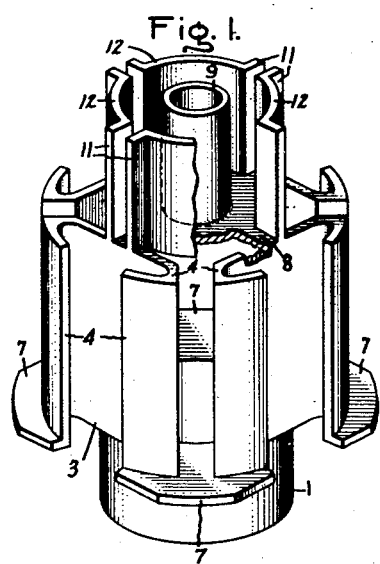
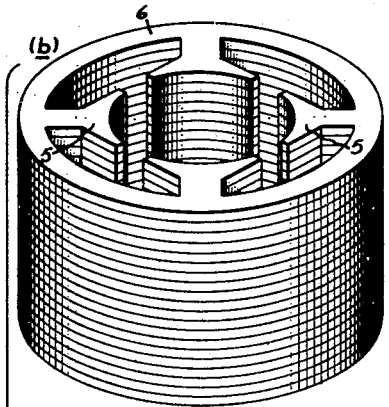
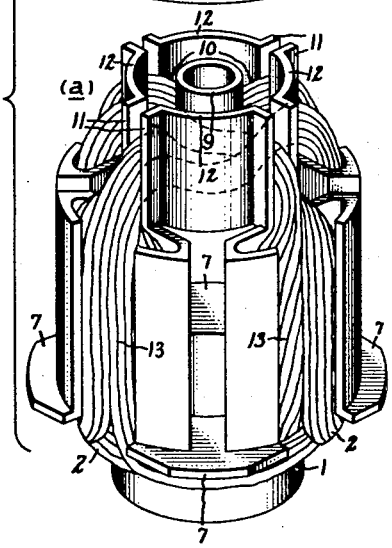
Fig. 2.
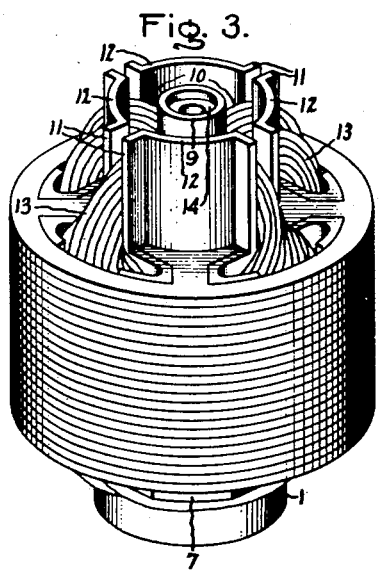
Fig. 3.
Inventor:
Arthur P. Adamson,
by Prowell P. Mack
His Attorney.

Patented July 27, 1948

2,445,986

UNITED STATES PATENT OFFICE 2,445,986

STATOR WINDING METHOD AND APPARATUS THEREFOR

Arthur P. Adamson, Ballston Spa, N. Y., assignor to General Electric Company, a corporation of New York Application August 8, 1946, Serial No. 689,107

4 Claims. (Cl. 171—252)

My invention relates to a new method of applying windings to salient pole dynamoelectric machine structures and a winding form unit used in carrying out the method, and is most useful in connection with field core structures having inwardly projecting salient poles where the winding operation is difficult. In carrying my invention into effect, I employ winding forms made of insulation material shaped to fit the salient pole field structures of a dynamoelectric machine and adapted to be slipped on and off from the salient pole field structure of the dynamoelectric machine by axial movement. The form is provided with open slot winding channels for guiding and placing the winding which may be wound thereon by hand or machinery while the form is removed from the dynamoelectric field structure. After the form is wound it may be slipped into the salient pole magnetic field structure and constitute the insulated winding of the salient poles of such field. In case the winding becomes damaged in use, the winding unit may be removed and replaced by another good unit within a few minutes. The size, shape, and winding channel arrangement of the form used will of course depend upon the size, shape, number of salient poles, etc. of the machine for which it is intended to be used.

The features of my invention which are believed to be novel and patentable will be pointed out in the claims appended hereto. For a better understanding of my invention, reference is made in the following description to the accompanying drawing in which Fig. 1 is a perspective view of a winding form suitable for carrying out my invention; Fig. 2(a) represents the form of Fig. 1 with a winding placed thereon; Fig. 2(b) represents a salient pole magnetic field structure of a dynamoelectric machine for which the insulated winding unit of Fig. 2(a) is intended. These parts of Fig. 2 are shown axially aligned and oriented for correct assembly by axial movement of the unit 2(a) into 2(b) to form the completely wound field structure shown in Fig. 3.

Referring now to Fig. 1, the form here shown comprises a cylindrical part 1 at the lower end which is made large enough in its internal diameter to allow the rotor structure (not shown) of the dynamoelectric machine of Fig. 3 to be inserted therein. Part 1 forms a supporting end structure for other parts of the form and an internal support for the end turns of the winding (such as the end turns at 2, Fig. 2(a)) to be placed thereon. Integral with the inner end of part 1 and supported thereby at one end are the four winding channel parts for the four-pole machine. Each channel has a bottom section 3 and side wall parts 4 shaped to fit the slots or the interior side surfaces of the pole pieces 5 and the interior of the yoke 6 of the field structure of Fig. 2(b). Also integral with the inner end of part 1 are the four radially extending sections 7. These sections 7 join the lower ends of the side walls 4 of adjacent coil channels. Parts 7 form stops for the lower ends of the field poles 5 when the form is inserted in place in the field structure and insulate the end turns 2 of the winding from the field poles. At the upper ends of the coil channels 3 there is radial supporting end plate 8 inwardly of the coil channels 3 and supporting the upper ends of such coil channels. The plate 8 has an inner axial opening and upwardly extending cylindrical collar 9 of sufficient internal diameter to allow the shaft of the rotor (not shown) to pass therethrough. The collar 9 shields the end turns at 10 (see Fig. 2(a)) of the winding from the shaft. The plate 8 also supports the inner lower ends of end turn channel parts 11 which channel parts are joined by webs 12 in the shape of segments of a cylinder. The end channel parts 11 and supporting webs 12 guide the end turns 10 between coil channels 3 on a radius sufficiently small as to permit the field poles 5 to pass over the end turns 10 when the winding form unit is inserted into the field structure. Thus the exterior surfaces of webs 12 are on a circle of less diameter than the circle conforming to the interior surfaces of the field poles 5.

The form shown in Fig. 1 is cast or made up of insulating material and for small machines is conveniently made of any suitable insulating plastic material. If not originally cast in one piece, all parts of this form are integrally joined together to make a one-piece substantially rigid unit.

This insulating coil framework is essentially rigid but does not need to be particularly strong or heavy since when shoved into place within the field structure of Fig. 2(b) it has a good fit with and becomes well supported by such field structure. Prior to insertion into the field structure the coils 13 are wound on the framework described. The coils may be wound by hand or machinery. In either case the winding operation becomes much easier than the usual procedure of winding the coils on a core structure with salient inwardly projecting pole pieces because now the wire used does not need to be threaded back and forth through the hollow outer yoke part 6.

Insulated wire is used in order to keep the adjacent wires of a coil insulated from each other but no further precaution is necessary to keep the coils insulated from the salient pole field core structure, since this is provided for in the construction of the coil framework described. The framework with its coils as represented in Fig. 2(a) is now axially aligned with the field core structure, Fig. 2(b) with the smaller end towards the field core.

The coil assembly is turned on its axis relative to the core structure until the coil channels of the coil assembly are in line with the slots between the pole pieces of the field structure as shown in Fig. 2, and then the coil assembly is shoved axially into the field structure until the coil openings are in line with the field poles and such field poles abut against stop 7 to produce the fully wound and insulated dynamoelectric machine stator structure of Fig. 3.

The fit of the wall parts 3 and 4 of the coil channels of the framework about the field poles 5 and inner periphery of yoke 6 of the field structure may be such that a limited amount of force is required in such assembly operation accompanied by a slight spreading of the side walls of adjacent coil channels and tightening of the coils. Such snug fit will hold the parts in place and prevent unintentional disassembly, but will not prevent quick replacement of the coil assembly with another one in case repair or replacement becomes desirable or necessary. For instance, the characteristics of a machine may be quickly changed by replacing a coil frame assembly having coils of a given number of turns and impedance with another coil assembly having another number of coil winding turns and impedance. The new winding assembly method described permits the rotor for the machine to be inserted and withdrawn through the large end 8 of the coil frame without any difficulty.

While a coil assembly frame for a four-pole field structure having a particular shape of teeth or field poles has been illustrated and described, it will be evident that the invention is more general in its application. In some applications for small motors I may wish to provide one of the rotor bearings within the sleeve 9. This is possible since the inner end of this sleeve is solidly and concentrically supported from the field core when the coil assembly is forced into place as seen from Figs. 1 and 3. Such a bearing is indicated at 14 in Fig. 3.

In the foregoing description pole pieces have been mentioned. When the pole pieces of a dynamoelectric machine become large in number or quite small they are more often referred to as teeth particularly when the machine has an odd number of poles or teeth. Within the practicable limits of my invention when I refer to pole pieces I mean to include teeth.

In accordance with the provisions of the patent statutes I have described the principle of operation of my invention together with the apparatus which I now consider to represent the best embodiment thereof, but I desire to have it understood that the apparatus shown is only illustrative and that the invention may be carried out by other means.

What I claim as new and desire to secure by Letters Patent of the United States, is:

1. The method of assembling the field winding on the field core of dynamoelectric machines having internally projecting field poles, which consists of forming a hollow rigid coil framework of insulating material with outwardly facing coil channels therein dimensioned to fit snugly between the poles of such field core, winding the field coils in the channels of such framework while removed from the field core keeping the end turns at one end within a circle less than the circle conforming to the inner surfaces of such field poles and then inserting the framework with such end first axially into such field core, until the openings in the coils thereon are in alignment with the poles of such field core.

2. In a dynamoelectric machine, a magnetic field structure having an outer yoke and inwardly projecting pole pieces, a coil winding for said pole pieces, and a hollow framework on which said winding is supported and which insulates the winding from the magnetic field structure, said framework having axially extending channels open at one end in alignment with and embracing the pole pieces so that the framework and winding are axially removable from one end of the field structure as a unit.

3. A removable coil assembly for the stator of a dynamoelectric machine having an outer yoke and inwardly projecting pole pieces, comprising a framework of insulating material having a hollow cylindrical portion at one end of sufficient inner diameter to accommodate a rotor for such machine, a smaller hollow cylindrical portion at the other end of sufficient internal diameter to accommodate a shaft for such machine, outwardly facing coil slot channel members supported between said cylindrical parts, said members having a number, spacing and shape to fit snugly between the inwardly projecting pole pieces and to clear the rotor for the machine for which designed, a coil winding for the stator pole pieces of such machine wound on said framework, and end turn supporting structure integral with the small cylinder end of said framework for confining the end turns of said winding at such end within a diameter less than the inner diameter of the stator pole piece circle of such machine.

4. A removable coil assembly unit for dynamoelectric machine stators of the type which have an outer yoke and inwardly projecting salient pole pieces, comprising a hollow integral structure of insulating material having a cylindrical supporting part at one end of sufficient internal diameter to pass over the rotor of the machine for which intended, a smaller hollow cylindrical part at the other end coaxial with the first-mentioned cylindrical part, skeleton coil holding structure supported between said cylindrical parts lying outside of a circle greater than the diameter of such rotor and between the pole pieces of the machine for which designed, a plurality of coils supported on said structure in position to excite the inwardly projecting salient poles of the machine for which designed, means for supporting the end turns of such coils at the small diameter cylinder end of the structure within a circle less than the diameter of a circle conforming to the inner faces of such pole pieces, and a bearing for the rotor of such machine supported within the smaller cylindrical end part, said coil assembly unit being axially removable from and replaceable into the salient pole stator of the machine for which designed.

ARTHUR P. ADAMSON.